(12) United States Patent
Weise (10) Patent No.: US 7,475,006 B2
(45) Date of Patent: Jan. 6, 2009

(54) METHOD AND APPARATUS FOR PARSING TEXT USING MUTUAL INFORMATION

(75) Inventor: David N. Weise, Kirkland, WA (US)

(73) Assignee: Microsoft Corporation, Inc., Redmond, WA (US)

( * ) Notice: Subject to any disclaimer, the term of this patent is extended or adjusted under 35 U.S.C. 154(b) by 1869 days.

(21) Appl. No.: 09/903,055

(22) Filed: Jul. 11, 2001

(65) Prior Publication Data

US 2003/0083861 A1     May 1, 2003

(51) Int. Cl.
 *G10L 15/00*     (2006.01)
(52) U.S. Cl. ................ 704/9; 704/2; 704/250
(58) Field of Classification Search ............. 704/9, 704/2, 250
See application file for complete search history.

(56) References Cited

U.S. PATENT DOCUMENTS

| | | | | |
|---|---|---|---|---|
| 4,868,750 A | * | 9/1989 | Kucera et al. ............... | 704/8 |
| 5,317,647 A | * | 5/1994 | Pagallo ........................ | 382/161 |
| 5,418,717 A | * | 5/1995 | Su et al. ...................... | 704/9 |
| 5,819,260 A | * | 10/1998 | Lu et al. ...................... | 707/3 |
| 6,278,967 B1 | * | 8/2001 | Akers et al. ................. | 704/2 |

OTHER PUBLICATIONS

U.S. Appl. No. 09/620,745, filed Jul. 20, 2000, David Weise.
Sharons A. Carabollo et al., "New Figures of Merit for Best-First Probabilistic Chart Parsing," Association for Computational Linguistics, vol. 24, No. 2, pp. 275-298 (1998).
U.S. Appl. No. 09/620,745, filed Jul. 20, 2000, David Weise.

* cited by examiner

*Primary Examiner*—Daniel D Abebe
(74) *Attorney, Agent, or Firm*—Theodore M. Magee; Westman, Champlin & Kelly, P. A.

(57) ABSTRACT

A method and parser are provided that generate a score for a node identified during a parse of a text segment. The score is based on a mutual information score that measures the mutual information between a phrase level for the node and a word class of at least one word in the text segment.

6 Claims, 7 Drawing Sheets

| Promoted node | Prior Art Goodness Measure | Node Contents |
|---|---|---|
| CHAR1 | 1.00000 | "?" |
| NOUN1 | 1.00000 | "Mary" |
| VERB1 | 1.00000 | "kissed" |
| VERB2 | 1.00000 | "say" |
| NOUN2 | 1.00000 | "John" |
| VERB3 | 1.00000 | "did" |
| PRON1 | 1.00000 | "Who" |
| BEGIN1 | 1.00000 | "" |
| NP1 | .99770 | "Who" |
| VP1 | .99770 | "did" |
| NP2 | .99770 | "John" |
| VP2 | .99770 | "say" |
| VP3 | .99770 | "kissed" |
| NP3 | .99770 | "Mary" |
| VP4 | .04498 | "kissed" "Mary" |
| PTPRTCL1 | .04732 | "kissed Mary" |
| VP5 | .01294 | "did" "John" |
| VP6 | .01510 | "Who" "did John" |
| NREL1 | .01419 | "Who did John" |
| COMPCL1 | .00923 | "kissed Mary" |
| COMPCL2 | .00692 | "did John" |
| VP7 | .00318 | "Who" "did" |
| VP8 | .00178 | "John" "say" |
| VP9 | .00093 | "say" "kissed Mary" |
| VP10 | .03837 | "John" "say kissed Mary" |
| VP11 | .00603 | "did" "John say kissed Mary" |
| COMPCL3 | .00354 | "did John say kissed Mary" |
| COMPCL4 | .00298 | "John say kissed Mary" |
| VP12 | .00117 | "Who" "did John say kissed Mary" |

FIG. 7

| Promoted node | SMTI Goodness Measure | Node Contents | | | | | |
|---|---|---|---|---|---|---|---|
| CHAR1 | 1.00000 | | | | | | "?" |
| NOUN1 | 1.00000 | | | | | | "Mary" |
| VERB1 | 1.00000 | | | | | "kissed" | |
| VERB2 | 1.00000 | | | | "say" | | |
| NOUN2 | 1.00000 | | | "John" | | | |
| VERB3 | 1.00000 | | "did" | | | | |
| PRON1 | 1.00000 | "Who" | | | | | |
| BEGIN1 | 1.00000 | "" | | | | | |
| NP1 | 5.7829 | "Who" | | | | | |
| VP1 | 1.7016 | | "did" | | | | |
| NP2 | 3.6838 | | | "John" | | | |
| VP2 | 2.0978 | | | | "say" | | |
| VP3 | 0.0456 | | | | | "kissed" | |
| NP3 | 2.5503 | | | | | | "Mary" |
| VP4 | 2.8841 | | "did" | "John" | | | |
| WHCL1 | 2.4027 | "Who" | "did" | John" | | | |
| VP5 | 1.5142 | | | | | "kissed | Mary" |
| COMPCL1 | 165.77 | | | | | "kissed | Mary" |
| VP6 | 14.571 | | | | "say" | "kissed | Mary" |
| VP7 | 36.7850 | | | "John" | "say | kissed | Mary" |
| INFCL1 | 5.8604 | | | "John" | "say | kissed | Mary" |
| VP8 | 5.2955 | | "did" | "John | say | kissed | Mary" |
| VP9 | 173.593 | "Who" | "did | John | say | kissed | Mary" |
| QUES1 | 22080 | "Who | did | John | say | kissed | Mary" ? |

FIG. 8

METHOD AND APPARATUS FOR PARSING TEXT USING MUTUAL INFORMATION

BACKGROUND OF THE INVENTION

The present invention relates to natural language processing. In particular, the present invention relates to parsing natural language text.

A natural language parser is a program that takes a text segment, usually a sentence, of natural language (i.e., human language, such as English) and produces a data structure, usually referred to as a parse tree. This parse tree typically represents the syntactic relationships between the words in the input segment.

In general, natural language parsers build the parse trees by applying syntax rules to the input text segment. Parsers apply these rules in either a "top-down" or a "bottom-up" manner.

In a bottom-up parser, all of the possible parts of speech for the individual words of the input text are first identified to form a set of word tokens. The parser then attempts to combine the individual word tokens into larger syntactic structures such as noun phrases, and verb phrases by applying syntax rules to the tokens. The resulting larger structures represent candidate nodes for the parse tree. The parser continues to try to build larger and larger structures by applying syntactic rules to previously identified candidate nodes. A full parse is achieved when a node spans the entire text segment.

The performance of a parser is based on its speed and its accuracy. Very accurate parsers can be formed by adopting exhaustive search strategies that build all of the possible full parse trees before identifying a "best" parse tree.

Although exhaustive-search parsers are accurate, they are also slow. To make the parse faster, the prior art has developed various techniques that prioritize the order in which nodes are formed during parse tree construction. The goal of these techniques is to form the correct parse while generating a minimum number of intermediate candidate nodes. Ideally, all of the candidate nodes that are formed would eventually be found in the final parse tree.

One prioritizing technique involves ordering the rules that are applied to the nodes and tokens so that rules with high probabilities of forming part of the final parse are applied before rules with lower probabilities. Other techniques order the tokens and candidate nodes based on some metric or "goodness measure" that indicates the likeliness that the node or token will appear in the final parse. The nodes or tokens that are higher in the list are used to form larger nodes before the nodes and tokens that are lower in the list.

Examples of metrics used to order the nodes include heuristic scoring techniques. These techniques assign starting scores to each of the tokens and provide some formula for generating scores for the larger nodes based in part on the scores of the tokens and intermediate nodes below the larger nodes. Other metrics include simple statistical metrics that count how frequently a node of a particular type, such as a verb phrase or noun phrase, appears in parse trees formed from a training corpus.

In one prior art technique, a more advanced statistical metric is used that utilizes more than just the node type when determining the probability of the node. In this technique, the headword of the node (the word that carries the focus of the segment spanned by the node), the phrase level of the node (the relative complexity of the phrase), and the syntactic history (such as whether or not the node is passive) are used to further divide the probability space so that the probability associated with a node better describes its actual probability of occurring in a parse tree.

Although these techniques for guiding the search for a parse tree have reduced the time needed to form the parse tree, there is an ongoing need to further reduce the parse time.

SUMMARY OF THE INVENTION

A method and parser are provided that generate a score or metric for a node identified during a parse of a text segment. The score is based on a mutual information score that measures the mutual information between a phrase level for the node and a word class of at least one word in the text segment.

DETAILED DESCRIPTION OF ILLUSTRATIVE EMBODIMENTS

Figure 1:
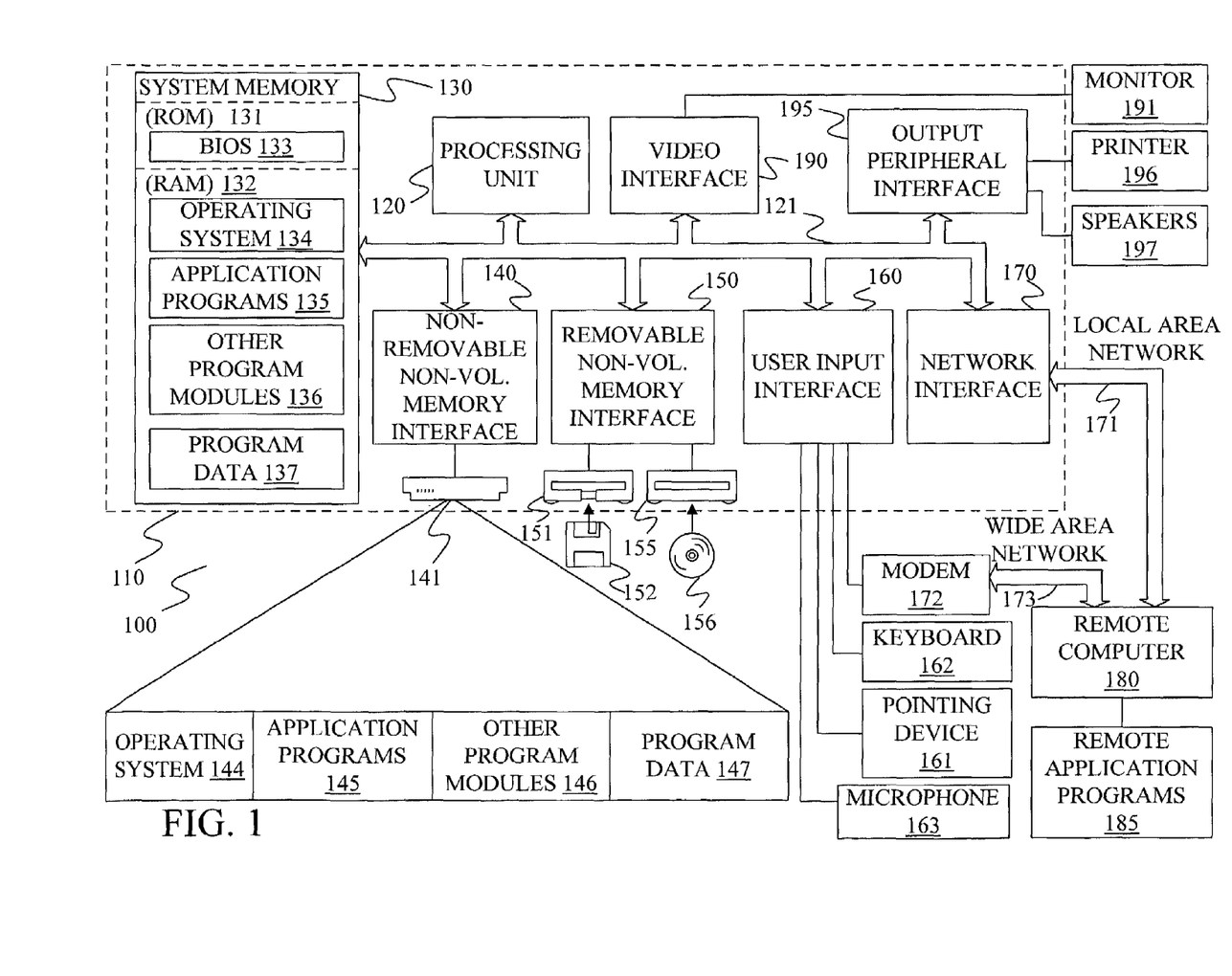
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
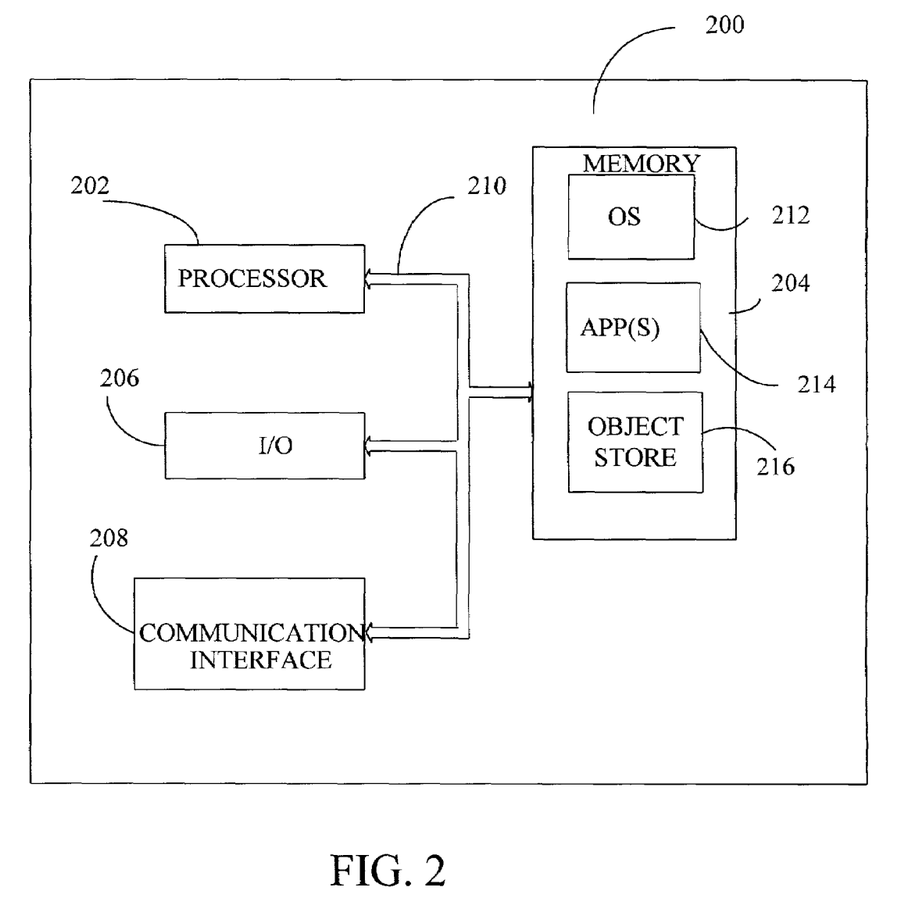
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
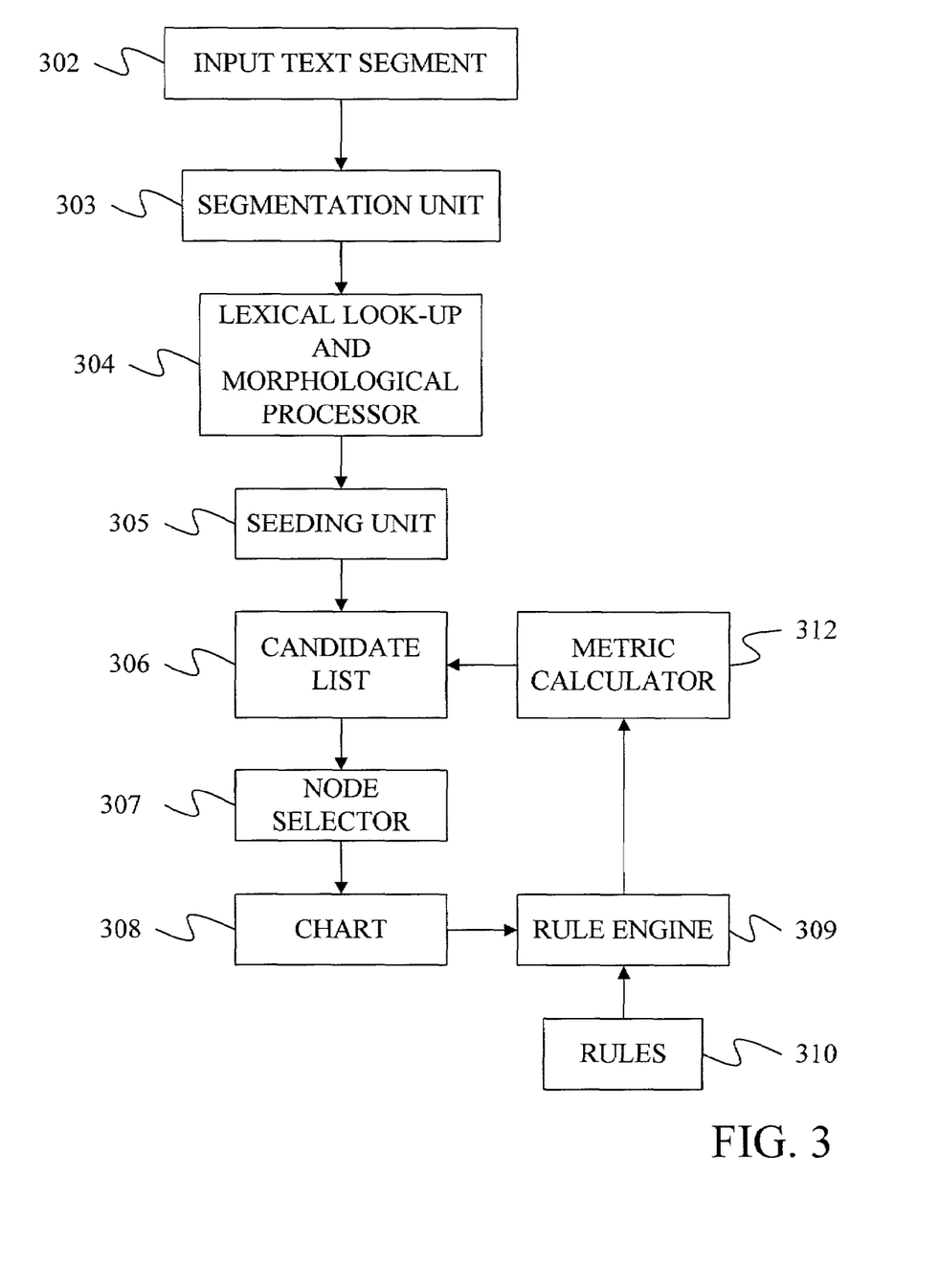
FIG. 3 is a block diagram of a natural language parser.

FIG. 3 provides a block diagram of a parser 300 in which the present invention may be practiced. In parser 300, a segmentation unit 303 divides an input text segment 302 into individual words, which are passed to a morphological processor and lexicon look-up 304 to identify possible parts of speech for each word. Under some embodiments, the morphological processor normalizes the morphological form of the words, if needed, before the words are applied against the lexicon to find the parts of speech. Each word/part-of-speech pair that is identified from the text segment forms a token that is inserted in a candidate list 306 as a starting node by a seeding unit 305.

A parse tree is then constructed through an iterative process. During each iteration, a single candidate node is promoted from candidate list 306 to a node chart 308 by a node selector 307. The promoted node is then tested against rules in a set of rules 310 by a rule engine 309 to see if the promoted node can be transformed into a higher level node using one of the rules. This can occur by applying a unary rule to the promoted node by itself or by applying a rule that combines the promoted node with one or more of the nodes in node chart 308.

During testing, the phrase types of the nodes under consideration are compared to the phrase types required by a rule. For example, a rule may take a verb phrase and a noun phrase to form a larger verb phrase. For such a rule, the promoted node and at least one other node in the node chart must provide the phrase types of noun phrase and verb phrase in order for the conditions of the rule to be satisfied. If the appropriate phrase types are not present in the node chart, the next rule in rule set 310 is examined.

Note that under some embodiments, the rules have additional conditions beyond the phrase types. For example, a rule may require number agreement (singular or plural) between a noun phrase and a verb phrase. In addition, the rule may require a particular phrase level for one or more of the constituent nodes.

When the node chart contains nodes that satisfy a rule, the rule is executed to form a new node. This new node is then scored using a metric calculator 312. As discussed in the background, the prior art has utilized a large number of different metrics for scoring the nodes formed by rules. For example, the frequency of the node type, the headword associated with the node, the phrase level of the node and the syntactic history of the node have all been used to form metrics for scoring the nodes. The present invention provides a new method for scoring the nodes, as discussed further below.

The scored node is then inserted into candidate list 306. Under most embodiments, candidate list 306 is sorted based on the score of each node, so that the node with the highest score is at the top of the candidate list. At the beginning of the next iteration, this top-most candidate node is promoted to the node chart.

The iterations described above continue until one or more nodes are formed in node chart 308 that span the entire input segment.

The new scoring metric provided by the present invention is a statistical trigram mutual information metric that utilizes the concepts of word classes, phrase levels and mutual information.

Word Classes

A word class is a set of words that have similar syntactic behavior. For example, all verbs could be grouped together in a single word class or, alternatively, verbs could be divided into two word classes: intransitive verbs, and all others.

The word classes do not have to be based only on parts of speech. For example, one set of word classes used with the present invention can be broken into four categories. The first category includes two marker classes, BEGIN and END, that are used to ensure that there is at least one word class to the left and to the right of every possible candidate node. The BEGIN word class is used to mark the beginning of the text segment and the END word class is used to mark the end of the text segment. Thus, a candidate node that includes the last word of the text segment will have the END class as the word class to its right.

A second category of classes are parts-of-speech. Under one embodiment, these classes include: nouns, plural nouns, verbs, adjectives, articles, possessive pronouns, determiners, adverbs, prepositions, preposition-conjunctions, conjunctions, subordinate conjunctions, pronouns, reflexive pronouns, and interjections.

A third category of classes is individual words. Under one embodiment, this category includes the single-word classes of "it", "there", "that", "this", "be", "do", "have", "how", "to", "both", and "either".

A fourth category of classes is punctuation. This category includes classes such as: comma, double quote, left parenthesis, right parenthesis, and character.

Those skilled in the art will recognize that the word classes listed above are only examples of possible word classes. Additional or different word classes may be used within the scope of the present invention.

Phase Levels

A phrase level indicates the phrase type of a node and the relative complexity of the phrase spanned by the node. For example, a noun phrase that is formed by combining a determiner with a smaller noun phrase would be at a higher level than the smaller noun phrase.

Figure 4:
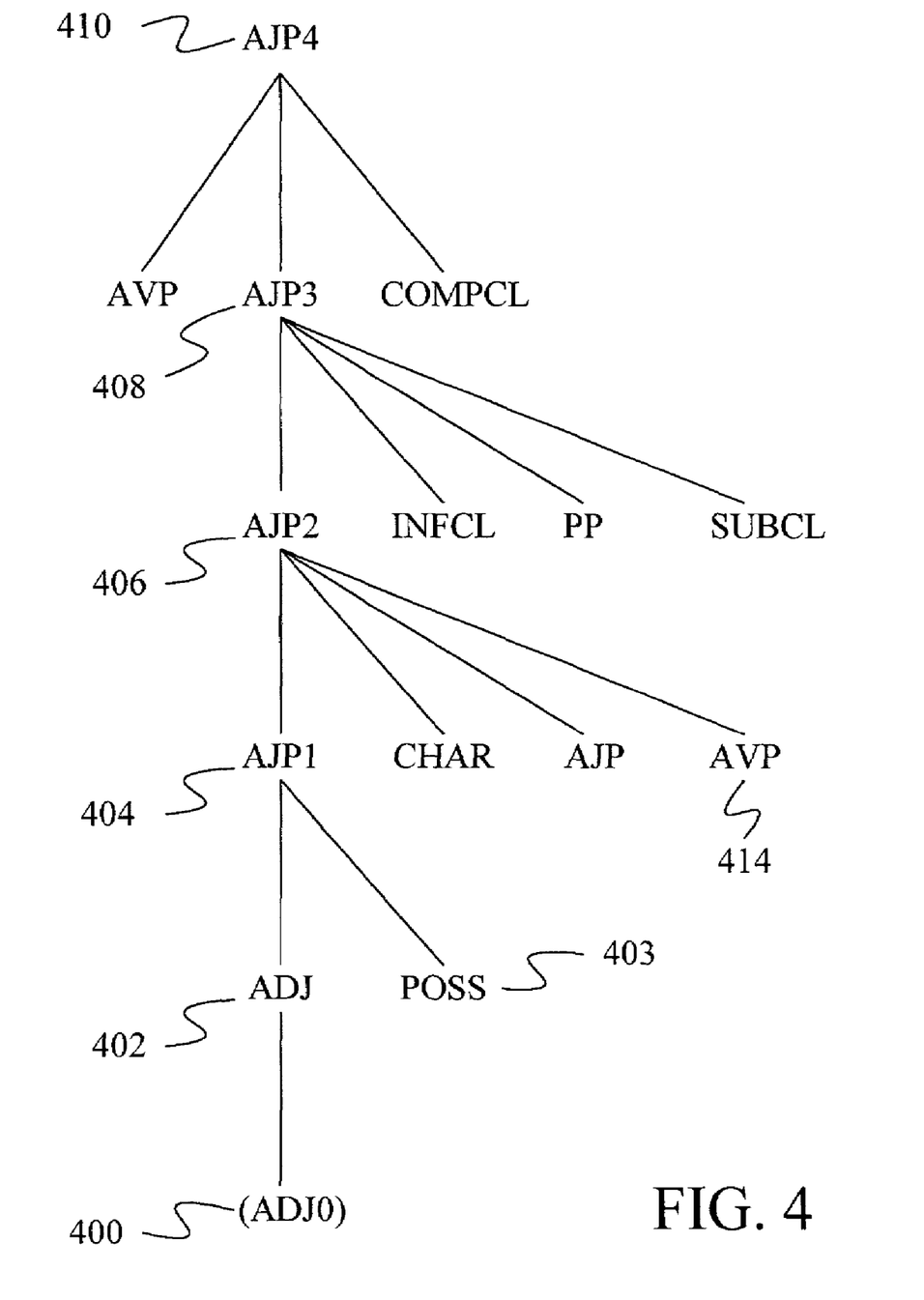
FIG. 4 is a diagram showing various phrase levels for adjectival phrase nodes.

FIG. 4 provides a diagram of some of the phrase levels for adjectival phrase types under embodiments of the present invention. Each phrase level is built from a lower level adjectival phrase, either through a unary rule that promotes the lower level phrase by itself or through a rule that combines the lower level phrase with some other phrase type.

At the base of the diagram is an actual word 400 from the text segment, which is identified as an adjective by part-of-speech node 402. Node 402 can be used to form a first level adjectival phrase 404, either through a unary rule applied to adjective node 402 or through a binary rule that combines node 402 with a possessive node 403. First level adjectival phrase 404 can be used in turn to form a second level adjectival phrase 406, either by applying it to a unary rule or to a more complex rule, such as a binary rule that combines node 404 with an adverbial phrase 414. In a similar manner, higher level nodes 408, and 410 are formed from lower phrase levels in the diagram.

Under one embodiment of the present invention, the following phrase levels are used when determining a mutual information score:

| | | |
|---|---|---|
| VERB | Verb | part-of-speech |
| CONJ | Conjunction | part-of-speech |
| NP1 | Noun phrase | level 1 |
| NP2 | Noun phrase | level 2 |
| NP3 | Noun phrase | level 3 |
| NP4 | Noun phrase | level 4 |
| NP5 | Noun phrase | level 5 |
| NP6 | Noun phrase | level 6 |
| NP7 | Noun phrase | level 7 |
| NP8 | Noun phrase | level 8 |
| VP1 | Verb phrase | level 1 |
| VP2 | Verb phrase | level 2 |
| VP3 | Verb phrase | level 3 |
| VP4 | Verb phrase | level 4 |
| VP5 | Verb phrase | level 5 |
| VP6 | Verb phrase | level 6 |
| VP7 | Verb phrase | level 7 |
| VP8 | Verb phrase | level 8 |
| VP9 | Verb phrase | level 9 |
| PRPRT1 | Past Participle | level 1 |
| PTPRT1 | Present Participle | level 1 |
| INFCL1 | Infinitive Clause | level 1 |
| INFCL2 | Infinitive Clause | level 2 |
| INFCL3 | Infinitive Clause | level 3 |
| SUBCL1 | Subordinate Clause | level 1 |
| SUBCL2 | Subordinate Clause | level 2 |
| SUBCL3 | Subordinate Clause | level 3 |
| AJP1 | Adjectival Phrase | level 1 |
| AJP2 | Adjectival Phrase | level 2 |
| AJP3 | Adjectival Phrase | level 3 |
| AJP4 | Adjectival Phrase | level 4 |
| AVP1 | Adverbial Phrase | level 1 |
| AVP2 | Adverbial Phrase | level 2 |
| AVP3 | Adverbial Phrase | level 3 |
| AVP4 | Adverbial Phrase | level 4 |
| PP1 | Prepositional Phrase | level 1 |
| PP2 | Prepositional Phrase | level 2 |
| PP3 | Prepositional Phrase | level 3 |
| PP4 | Prepositional Phrase | level 4 |
| PP5 | Prepositional Phrase | level 5 |
| COMPCL1 | Compound Clause | level 1 |
| CONJP1 | Conjunctive Phrase | level 1 |
| POSS1 | Possesive Phrase | level 1 |
| SENT | Sentence | |

Note that the set of phrase levels listed above is only an example of the possible phrase levels that may be used with the present invention. In other embodiments, some of these phrase levels are not used and/or other phrase levels are used.

Mutual Information

Mutual information measures the correlation between two or more events. For three events, mutual information can be defined mathematically as:

$$I(x, y, z) = \log \frac{P(x, y, z)P(y)}{P(x, y)P(y, z)} \qquad \text{Eq. 1}$$

where I(x,y,z) is the mutual information between events x, y and z, P(x,y,z) is the joint probability of x, y and z occurring together, P(y) is the probability of event y occurring, P(x,y) is the joint probability of events x and y occurring and P(y,z) is the joint probability of events y and z occurring.

Alternatively, mutual information may be defined as:

$$I(x, y, z) = \log \frac{P(x, y, z)}{P(x)P(y)P(z)} \qquad \text{Eq. 2}$$

Under one embodiment of the present invention, the score applied to a node by metric calculator 312 is calculated as the mutual information between a phrase level of a candidate node and word classes of words to the left and right of the candidate node. This statistical trigram mutual information value can be calculated either as:

$$I(wc_l, PL_{node}, wc_r) = \log \frac{P(wc_l, PL_{node}, wc_r)P(PL_{node})}{P(wc_l, PL_{node})P(PL_{node}, wc_r)} \qquad \text{Eq. 3}$$

or $$I(wc_l, PL_{node}, wc_r) = \log \frac{P(wc_l, PL_{node}, wc_r)}{P(wc_l)P(PL_{node})P(wc_r)} \qquad \text{Eq. 4}$$

where $PL_{node}$ is the phrase level of the node, $wc_l$ is the word class of the word to the left of the node, and $wc_r$ is the word class of the word to the right of the node.

Because words can fall into more than one class, there can be several word classes to the left of the node and several word classes to the right of the node. One embodiment of the present invention generates a separate mutual information value for each possible combination of left and right word classes. The individual mutual information values are then combined into a single value by weighting each mutual information value based on the probability of the words to the left and right being in the particular word classes. In terms of an equation:

$$I(node) = \sum_{left\ classes} \sum_{right\ classes} P(wc_l \mid word_l) P(wc_r \mid word_r) I(wc_l, PL_{node}, wc_r)$$ Eq. 5 where $P(wc_l \mid word_l)$ is the probability of word class $wc_l$ given the word to the left of the node, and $P(WC_r \mid word_r)$ is the probability of word class $wc_r$ given the word to the right of the node.

Under other embodiments, the mutual information score does not use the word class of both the word to the left and the word to the right of the node. Instead, the mutual information is calculated based on the phrase level and the word class of either the word to the left or the word to the right.

Before a text segment can be parsed using the mutual information scoring metric of the present invention, the probabilities of equations 3 or 4 must be determined and the candidate list must be seeded with phrase-level nodes for each word in the text segment.

Figure 5:
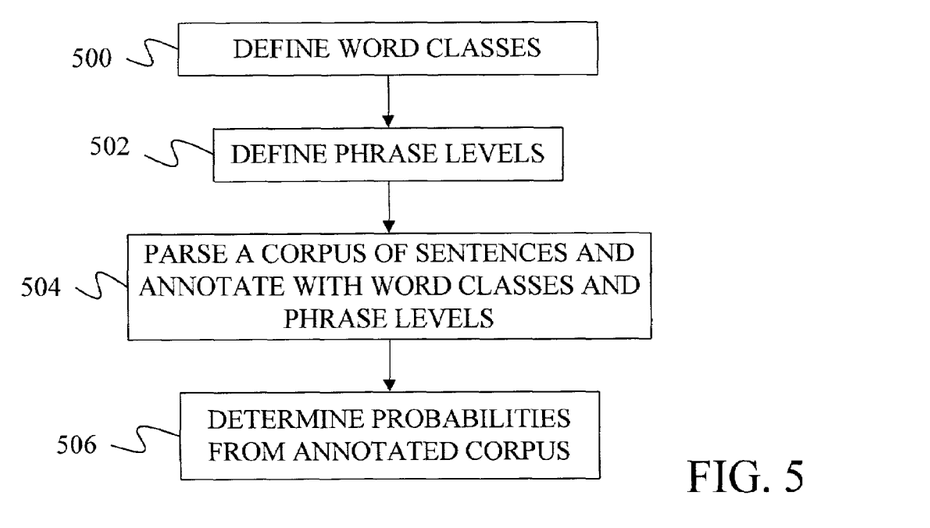
FIG. 5 is a flow diagram for training a parser under embodiments of the present invention.
Figure 6:
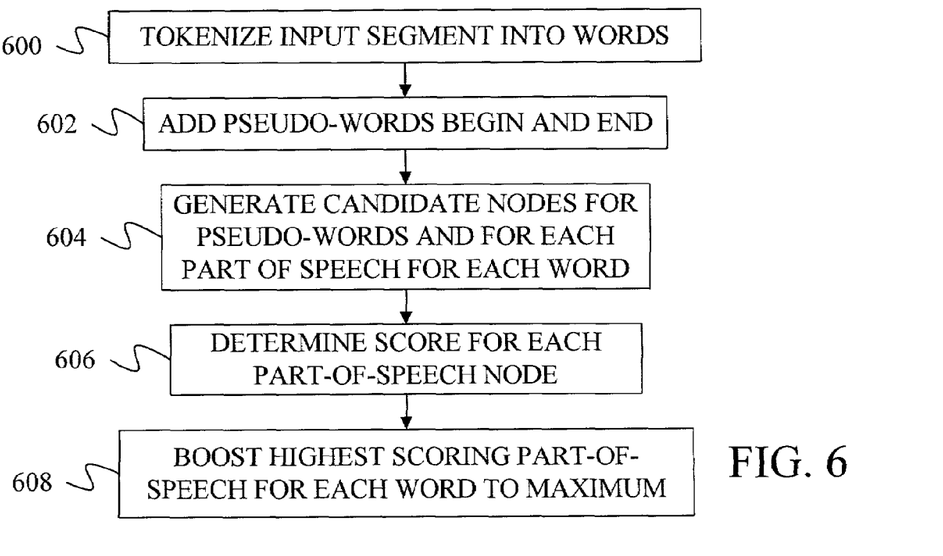
FIG. 6 is a flow diagram for seeding a candidate list.

FIG. 5 provides a flow diagram for determining the probabilities used in equations 3, 4 and 5 and FIG. 6 provides a flow diagram for seeding the candidate list.

In steps 500 and 502 of FIG. 5, the word classes and the phrase levels that will be used are defined. In step 504, a corpus of sentences is parsed either by hand or by some other parsing system. During the parse, psuedo-words BEGIN and END are added to the beginning and ending or each sentence to insure that each node in the parse tree has a word class to its left and right. The parse trees formed by this parsing are then annotated with word classes and phrase levels. Note that a single word class is typically identified for each word in the corpus.

At step 506, the probabilities for equations 3-5 are determined by counting the occurrences of word classes and phrase levels in the corpus parse trees. In particular, the probability of a word class, either to the left or to the right of a phrase level, is determined as:

$$P(wc_l) = P(wc_r) = \frac{\text{count of words in word class in corpus}}{\text{number of words in corpus}}$$ Eq. 6

The probability of a phrase level is determined as:

$$P(PL) = \frac{\text{count of nodes of } PL \text{ phrase level in corpus}}{\text{number of nodes in corpus parse trees}}$$ Eq. 7

The joint probability of a selected word class, $swc_l$, being to the left of a selected phrase level, sPL, is determined as:

$$P(swc_l, sPL) = \frac{\text{count of } (swc_l, sPL) \text{ pairs}}{\sum_{i=1}^{I} \sum_{j=1}^{J} \text{count of } (wc_i, PL_j) \text{ pairs}}$$ Eq. 8 where the count in the numerator is the number of times the selected word class appears to the left of the selected phrase in the corpus, I is the total number of word classes in the corpus, and J is the total number of phrase levels in the corpus.

Similarly, the joint probability of a selected word class, $swc_r$, being to the right of a selected phrase level, sPL, is determined as:

$$P(sPL, swc_r) = \frac{\text{count of } (sPL, swc_r) \text{ pairs}}{\sum_{i=1}^{I} \sum_{j=1}^{J} \text{count of } (PL_j, wc_i) \text{ pairs}}$$ Eq. 9

The joint probability of a selected trigram $(swc_l, sPL, swc_r)$ is determined as:

$$P(swc_l, sPL, swc_r) = \frac{\text{count of } (swc_l, sPL, swc_r) \text{ trigrams}}{\sum_{i=1}^{I} \sum_{j=1}^{J} \sum_{k=1}^{K} \text{count of } (wc_i PL_j, wc_k) \text{ trigrams}}$$ Eq. 11 where I is the total number of word classes found to the left of nodes, J is the total number of phrase levels, and K is the total number of word classes found to the right of nodes.

Lastly, the probability of a particular word being in a particular word class is determined as:

$$P(swc \mid word) = \frac{\text{count of times word is in } swc}{\text{number of times word appears in corpus}}$$ Eq. 12 where swc is a selected word class.

Once the probabilities have been determined at step 506, the parser training is complete and the parser may be used to parse an input text segment. The first step in parsing a segment is step 600 of FIG. 6, in which the input segment is tokenized into words. At step 602, the pseudo-words BEGIN and END are added to the beginning and ending of the sentence.

Candidate nodes for the candidate list are generated at step 604. Under one embodiment, a separate candidate node is generated for each possible part of speech for each word in the text segment. These parts of speech can be identified using lexicon look-up 304 of FIG. 3. Candidate nodes are also formed for the pseudo-words BEGIN and END.

At step 606, a score is determined for each candidate node. This score can be a part-of-speech probability, which indicates the likelihood that the word will take on the particular part of speech associated with the node, or it can be a mutual information score that is formed using equation 3 or 4 above. In order to use equations 3 or 4, a phrase level must be associated with the part-of-speech node because the node is technically not a phrase. This can be accomplished by identifying the lowest phrase level that would be formed by applying a unary rule to the part-of-speech node. This phrase level is then used in equations 3 or 4.

Once the scores have been generated, the highest score for each word is identified. In one implementation, the nodes associated with the highest score for each word are then boosted at step 608 by setting their scores to the maximum possible score. This moves at least one node for each word in the text segment to the top of the candidate list.

Once step 608 is complete, the candidate list has been seeded, and the iterative process described above in connection with FIG. 3 above may begin while using the mutual information metric of the present invention. In some embodiments, if two or more candidate nodes have the same mutual information score, other prior art goodness measures, either heuristic or statistical, may be used to identify which of these nodes should be promoted.

Under one embodiment, the rules used in parsing are ordered such that unary rules are applied to the nodes in node chart 308 before more complex rules. This allows phrase-level nodes to be formed from the part-of-speech nodes quickly so that the parse can be finished faster.

In additional embodiments, directed search templates are used in conjunction with the present invention to identify spans in the segment that exhibit multiple-valid-parse problems. In a directed search, a candidate node is compared to a set of templates when it is eligible to be promoted to the node chart. If it matches one of the templates, nodes representing alternative constructions of the matched template are constructed, scored using the mutual information metric of the present invention and added to the candidate list. The highest scoring node is then promoted to the node chart.

Figure 7:
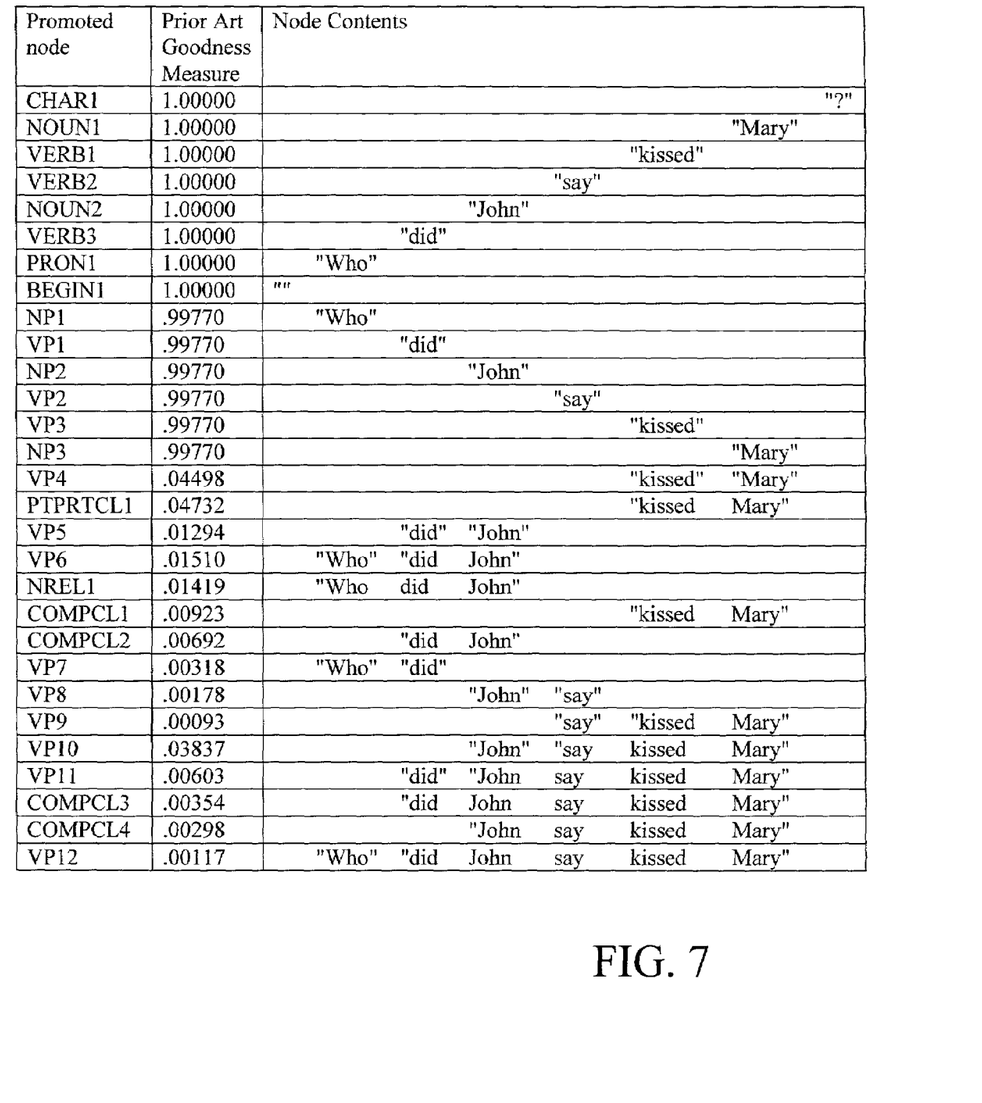
FIG. 7 is an example node chart formed using prior art goodness metrics.
Figure 8:
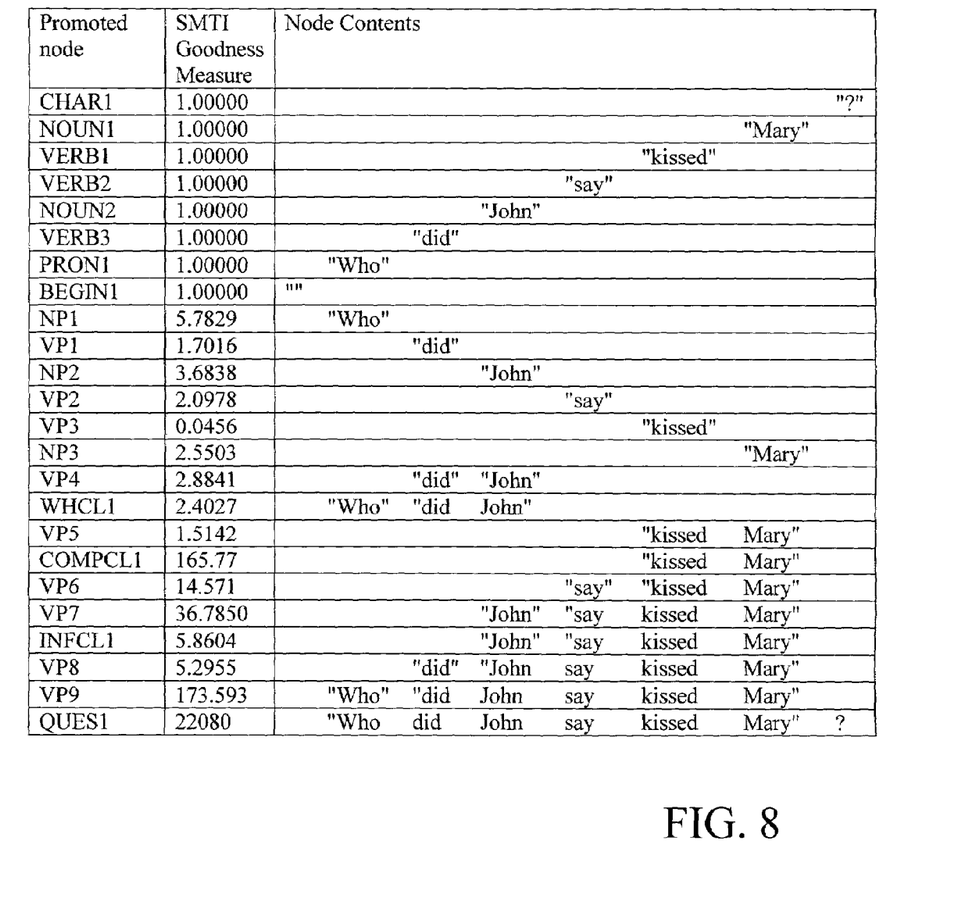
FIG. 8 is a node chart formed using the statistical trigram mutual information goodness metric of the present invention.

The improvement in parsing efficiency provided by the mutual information metric of the present invention can be seen by comparing the node charts of FIGS. 7 and 8, which are formed during the parse of the sentence "Who did John say kissed Mary?" The node chart of FIG. 7 is formed using a goodness measure of the prior art to score the candidate nodes. The node chart of FIG. 8 is formed using the mutual information metric of the present invention. As can be seen, the node chart of FIG. 8 contains fewer nodes, meaning that a full parse was found faster with the mutual information metric of the present invention than with the prior art goodness measure.

Although the present invention has been described with reference to particular embodiments, workers skilled in the art will recognize that changes may be made in form and detail without departing from the spirit and scope of the invention.

What is claimed is:

1. A method of generating a score for a node identified during a parse of a text segment, the method comprising:
   identifying a phrase level for the node;
   identifying a word class for at least one word that neighbors a text spanned by the node by:
      identifying a word class for a word to the left of the text spanned by the node; and
      identifying a word class for a word to the right of the text spanned by the node; and
   generating a score by determining a mutual information metric based on the phrase level and the word class, wherein determining a mutual information metric comprises determining a mutual information metric based on the phrase level of the node, the word class of the word to the right of the text spanned by the node and the word class of the word to the left of the text spanned by the node.

2. The method of claim 1 wherein identifying a word class further comprises:
   identifying all possible word classes for a word to the left of the text spanned by the node; and
   identifying all possible word classes for a word to the right of the text spanned by the node.

3. The method of claim 2 wherein generating a score comprises generating a score based in part on all of the identified word classes.

4. The method of claim 1 wherein identifying a word class comprises identifying all possible word classes for at least one word.

5. A method of generating a score for a node identified during a parse of a text segment, the method comprising:
   identifying a phrase level for the node;
   identifying a word class for at least one word that neighbors a text spanned by the node by:
      identifying all possible word classes for a word to the left of the text spanned by the node; and
      identifying all possible word classes for a word to the right of the text spanned by the node; and
   generating a score by determining a mutual information metric based on the phrase level and the word class, wherein generating a score comprises generating a score based in part on all of the identified word classes.

6. The method of claim 5 wherein determining a mutual information metric comprises determining a mutual information metric based on the phrase level of the node, the word class of the word to the right of the text spanned by the node and the word class of the word to the left of the text spanned by the node.

* * * * *